United States Patent
Kumar et al.

(10) Patent No.: US 12,320,648 B1
(45) Date of Patent: Jun. 3, 2025

(54) ARTIFICIAL INTELLIGENCE MODEL-BASED TRAVEL TIME ESTIMATION

(71) Applicant: Amazon Technologies, Inc., Seattle, WA (US)

(72) Inventors: Aman Kumar, Faridabad (IN); Maniratan Singh Naorem, Redmond, WA (US); Yegor Malinovskiy, Kirkland, WA (US); Shashank Saraogi, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 171 days.

(21) Appl. No.: 17/740,857

(22) Filed: May 10, 2022

(51) Int. Cl.
| | |
|---|---|
| *G01C 21/20* | (2006.01) |
| *G01C 21/34* | (2006.01) |
| *G01C 21/36* | (2006.01) |
| *G06N 5/022* | (2023.01) |
| *G06N 5/04* | (2023.01) |

(52) U.S. Cl.
CPC ......... *G01C 21/20* (2013.01); *G01C 21/3453* (2013.01); *G01C 21/3691* (2013.01); *G06N 5/022* (2013.01); *G06N 5/04* (2013.01)

(58) Field of Classification Search
CPC ............. G01C 21/20; G01C 21/3453; G01C 21/3691; G06N 5/022; G06N 5/04
See application file for complete search history.

(56) References Cited

U.S. PATENT DOCUMENTS

| | | | |
|---|---|---|---|
| 8,358,222 B2 * | 1/2013 | Gueziec | G08G 1/09675 340/905 |
| 8,812,228 B2 * | 8/2014 | Konig | H04L 45/123 340/988 |
| 9,726,500 B2 * | 8/2017 | Meredith | G01C 21/20 |
| 10,330,482 B2 * | 6/2019 | Chen | G06Q 10/047 |
| 10,962,372 B1 * | 3/2021 | Rao | G01C 21/3484 |
| 2009/0112461 A1 * | 4/2009 | Murphy | G01C 21/20 701/532 |

(Continued)

OTHER PUBLICATIONS

"Linear Model Trees", Imtree {partykit}, R Documentation, Available online at R: Linear Model Trees (r-project. org), 4 pages.

(Continued)

*Primary Examiner* — Kurt Philip Liethen
(74) *Attorney, Agent, or Firm* — Kilpatrick Townsend & Stockton LLP

(57) ABSTRACT

Artificial intelligence (AI) model-based travel time estimation is described herein. For example, a computer system receives a request of an application for a travel time between a first location and a second location. The computer system determines a travel path between the first location and the second location. The travel path includes a travel segment. The computer system determines data indicating a geographic feature of the travel segment. The computer system generates, based on the data indicating the geographic feature, an input to an AI model. The AI model is trained to predict travel times. The computer system determines the travel time based on an output of the AI model in response to the input. The output indicates the travel time. The computer system sends a response indicating the travel time to the application.

19 Claims, 13 Drawing Sheets

(56) References Cited

U.S. PATENT DOCUMENTS

| | | | | |
|---|---|---|---|---|
| 2015/0292894 | A1* | 10/2015 | Goddard | G01C 21/3453 |
| | | | | 701/400 |
| 2018/0364062 | A1* | 12/2018 | Wang | G06Q 10/063114 |
| 2019/0018426 | A1* | 1/2019 | Yao | G05D 1/0212 |
| 2019/0178648 | A1* | 6/2019 | Bagchi | G01C 21/3453 |
| 2021/0055122 | A1* | 2/2021 | Pham | G08G 1/0145 |
| 2021/0347383 | A1* | 11/2021 | Siebert | G01C 21/3407 |

OTHER PUBLICATIONS

Zeileis et al., "Model-based Recursive Partitioning," Journal of Computational and Graphical Statistics, 2008, 17(2), 492-514, 19 pages, Available online at https://www.zeileis.org/papers/Zeileis+Hothorn+Hornik-2008.pdf.

Zeileis et al., "Party with the Mob: Model-based Recursive Partitioning in R", Open Archives Initiative (OAI), Available online at https://cran.r-project.org/web/packages/party/vignettes/MOB.pdf, Jul. 2010, 14 pages.

* cited by examiner

ARTIFICIAL INTELLIGENCE MODEL-BASED TRAVEL TIME ESTIMATION

BACKGROUND

More and more users and entities are turning to online services for day-to-day activities. Many of the services span both the digital world and the physical world. For example, a user may operate a computing device to obtain travel instructions by way of an online travel service. Given the computing device's current location and a destination, the online travel instructions can send travel data for presentation by the computing device, and the presentation can take the form of a graphical user interface (GUI) map.

BRIEF DESCRIPTION OF THE DRAWINGS

Various embodiments in accordance with the present disclosure will be described with reference to the drawings, in which.

DETAILED DESCRIPTION

Figure 1:
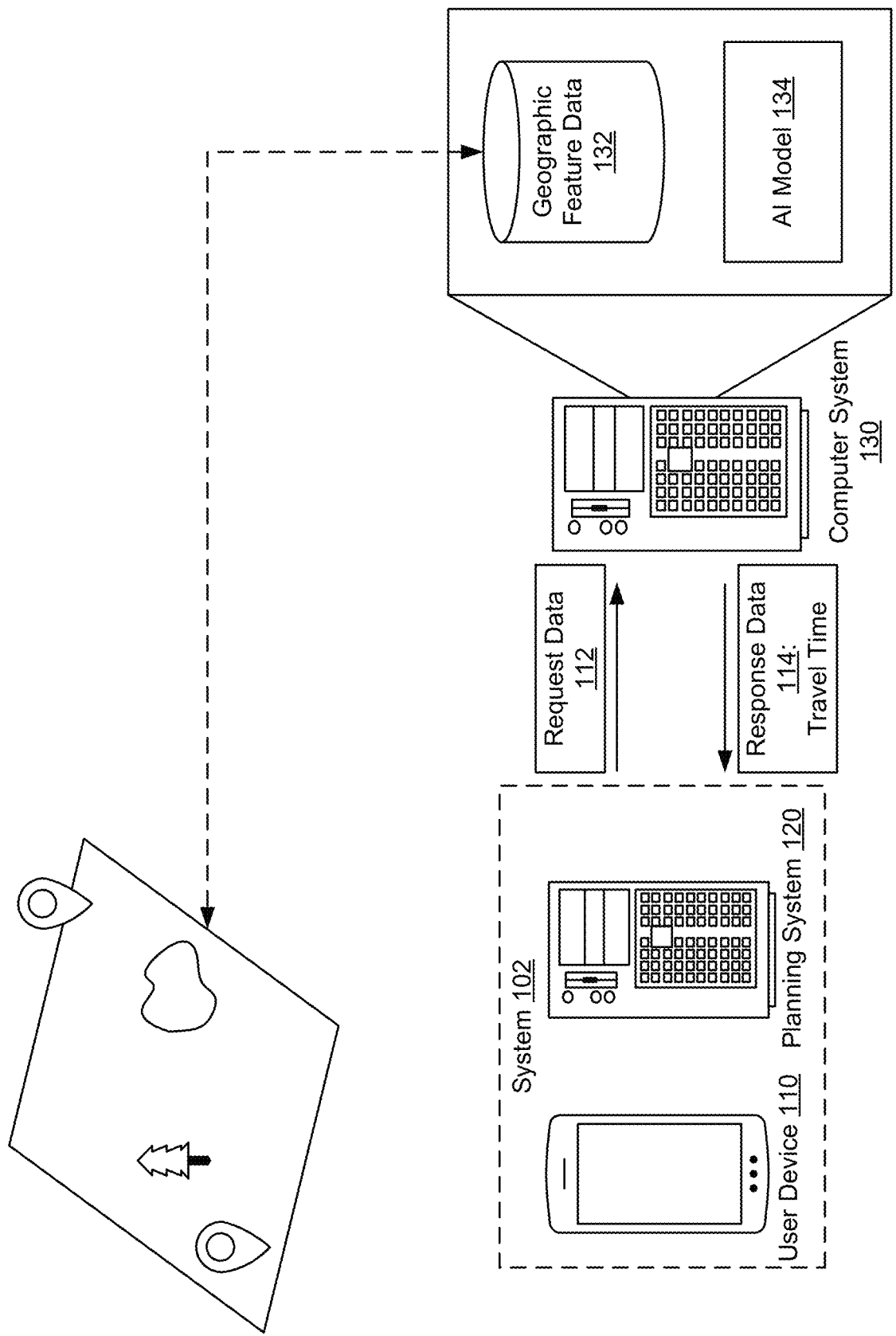
FIG. 1 illustrates an example of a system for travel time estimation, according to embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, artificial intelligence (AI) model-based travel time estimation. In an example, a computer system can receive a request of an application for a travel time between a first and a second location. The application can be, for instance, a route planning application, a resource planning application, a delivery application, or a user travel application. The computer system determines a travel path between the first location and the second location. The travel path includes a travel segment. The computer system determines data indicating a geographic feature of the travel segment. The geographic feature may be a distance range to travel the travel segment, where this distance range indicates a freedom of traveling the travel segment along many variable ways. The computer system can generate, based on the data indicating the geographic feature, an input to an AI model that is trained to predict travel times. Optionally, the input can also include a haversine distance, a pedestrian network travel time, a pedestrian network total distance, types of travel segments of the pedestrian network, and/or imagery-related data associated with the travel path (e.g., images of the travel path, elevation data of the travel path). The computer system can determine the travel time based on an output of the AI model that indicates the travel time. The computer system sends a response indicating the travel time to the application for presentation at a user interface.

To illustrate, consider an example of a user using a user device with a delivery application to view an assigned delivery route. The delivery application can indicate that the user is to walk from a first location to a second location where an item is to be delivered. The delivery application sends a request for a travel time between the first location and the second location, where the travel time corresponds to a walk time. The computer system receives satellite, aerial, or other imagery data to determine a travel path between the first location and the second location. For instance, the computer system determines that from the first location, the travel path includes a first sidewalk segment, then a park segment, and then another sidewalk segment that leads to the second location. Upon determining that the travel path includes the park segment, the computer system can determine a geographic feature (e.g., distance range) of traveling through the park from the first sidewalk segment to the second sidewalk segment. This distance range corresponds to the freedom of movement of the user through the park. For instance, the lower bound of the distance range can correspond to the user traveling along the shortest distance from the first sidewalk to the second sidewalk through the park. the upper bound of the distance range can correspond to the to the longest to the user traveling along the longest distance from the first sidewalk to the second sidewalk through the park (e.g., by zig-zagging). The geographic feature can also indicate locations of trees or other obstacles, such as a lake, in the park. The computer system generates an input to an AI model based on the geographic feature, and the AI model outputs an indication of the travel time between the first location and the second location. The computer system sends the travel time to the delivery application, which displays the travel time, and optionally the travel path, at the user device. The user can then travel from the first location to the second location. As the user travels, the delivery application can send a current location of the user device to the computer system, which can continuously update the travel time to the second location.

Embodiments of the present disclosure provide several technical advantages over conventional travel time estimation techniques. Conventional techniques may involve using a haversine distance between locations or using a shortest path computed on a pedestrian road network. But, the haversine distance typically results in an underestimated distance, and therefore an underestimated travel time. Alternatively, the shortest path of the pedestrian road network typically results in an overestimated distance since the pedestrian road network does not account for the possibility of a user deviating from the road network (e.g., through a park). Thus, the pedestrian road network typically results in an overestimated travel time. In comparison, the embodiments provide a system capable of accounting for geographic features and freedom of movement, resulting a more accurate travel time estimation. In the case of route and/or resource planning, delivery routes and resources can be planned and used more accurately because of the improved travel time estimation, resulting in an improvement to resource deployment and use. In the additional or alternate case of delivery applications and/or user travel application, a better user experience is provided because of the improved travel time estimation.

In the interest of clarity of explanation, various embodiments of the present disclosure are illustrated in connection with delivery route and resource planning applications and delivery applications, where a travel time estimation is used to plan a delivery route, plan a resource to server delivery routes, and/or indicated to a delivery driver. The travel time corresponds to a walk time of the delivery driver walking between delivery locations. However, the embodiments are not limited as such. For example, the embodiments equivalently apply to any travel time estimation, any type of resource, and/or any type of application that can present travel time. A travel time can be more estimated using the disclosed embodiments, in particular in situations where a travel path is not constrained and at least a segment thereof can allow a freedom of movement and/or traveling therein. The resource can be an unmanned vehicle, including unmanned ground vehicles (such as vehicles and/or mobile robots), unmanned aerial vehicles, and/or unmanned water vehicles. In addition to a delivery application, a route planning application, and a resource planning application, the application can be a user application available to a first user and, given the proper user permissions, providing at least a delivery time estimation of a second user and/or a resource operable by the second user or an entity other than the first user. For instance, the user application may be a mobile application (e.g., a "smartphone app") or a browser application operable by the first user to order an item and track the item's delivery, request a service (e.g., a bicycle ride) and track the travel time of a resource to be delivered by the service (e.g., the bicycle), determine a location of the second user (e.g., a family member, a friend) and estimate the travel time between the two users, or determine a location of a resource (e.g., a bicycle) and estimate the travel time to the resource.

FIG. 1 illustrates an example of a system for travel time estimation, according to embodiments of the present disclosure. A computer system 130 is in communication with a system 102, which may include a user device 110 and/or a planning system 120. While the user device 110 is illustrated as a smartphone, the user device 110 may alternatively be a laptop, personal computer, tablet, or other device capable of presenting information about an item delivery. The computer system 130 is capable of supporting various computing services including, for instance, travel time estimation operations. In particular, the computer system 130 includes one or more processors, one or more memories storing computer-readable instructions for a travel time estimation service, one or more network interfaces, and/or other computing components for communication with the system 102.

In an example, the computer system 130 receives request data 112 from the system 102. The request data 112 can be from an application of the user device 110 (e.g., a delivery application) or the planning system 120 (e.g, a route planning application or a resource planning application). The request data 112 can be a request for a travel time between a first location and a second location. The first location and the second location can be provided as Global Positioning System (GPS) coordinates, for instance. The first location and/or the second location can be an item delivery location or a parking location associated with an item delivery location. The item may be a package, food, mail, or any other deliverable item. The computer system 130 can determine a travel time between the first location and the second location depending on the mode of travel. For example, a user may be walking between the first location and the second location, so the travel time can be a walking time. Alternatively, the user may bike between the first location and the second location, so the travel time can be a biking time. In other examples, the user may be a robot deliverer, so the travel time can be a time length for the robot deliverer to travel between the first location and the second location. In short, the travel time can be associated with a travel mode in which there is freedom of choosing movement (e.g., not movement confined to traveling along a predefined path that is not associated with a distance range).

The computer system 130 can determine a travel path between the first location and the second location, and the travel path can include a travel segment. The travel segment can be have a distance range, such as the distance between the start and the end of the travel segment can vary in length depending on a freedom of movement. Upon determining the travel segment, the computer system 130 can access geographic feature data 132 to identify a geographic feature that is associated with the travel segment. The geographic feature data 132 can indicate a type of the travel segment (e.g., park, sidewalk, etc.), a distance range of the travel segment (e.g., to account for the fact that a user has freedom to travel any desired way throughout a park), image data that corresponds to the travel segment, obstacle data of a travel obstacle in an area that contains the travel segment, or elevation data of the travel segment. For instance, the map corresponding to the geographic feature data 132 illustrates travel obstacles of a tree and a lake between the first location and the second location. The image data may be based on satellite imagery of an area containing the first location and the second location, aerial imagery of the area, or terrestrial imagery of the area, and the elevation data may be from a light detection and ranging (Lidar) system, for instance.

The computer system 130 uses an AI model 134 to determine response data 114 that includes the travel time. The geographic feature data 132 associated with the travel segment is input to the AI model 134, which is trained to predict travel times. A constant value (e.g., 1.4 m/s) can be used for an average travel speed to compute the travel time. In some examples, the AI model 134 also receives a haversine distance between the first location and the second location, a pedestrian network model-predicted travel time between the first location and the second location, and the travel path as inputs. A pedestrian network can represent a travel network of walking paths (e.g., sidewalks or safe roadways) navigable by a walker, biker, or robot deliverer.

The AI model 134 can also receive user account data related to the user (such as user profile data indicating a history of deliveries and related travel times), item data related to deliveries to be performed (e.g., identifiers and/or quantities of items to be delivered, dimensions of such items, weights of such items, and the like), and/or environmental data associated with the travel paths, such as expected weather conditions. The AI model 134 outputs an indication of the travel time, which is included in response data 114 to the system 102. The application of the system 102 receives the response data 114, and then either presents the response data 114 at the user device 110 or uses the response data 114 to plan routes and resources for item deliveries. The response data 114 can also identify the travel path that was used for estimating the travel time, where this travel path can be displayed on a map. In addition, the computer system 130 may determine an estimated delivery time for the item based on the travel time. The computer system 130 can send an indication of the estimated time of arrival of the item to a device associated with a customer receiving the item, where the device may execute the relevant user application.

Although FIG. 1 illustrates a client-server architecture (e.g., the system 102 being a client and the computer system 130 being a server), other possible architectures are possible. For instance, the functionalities of the computer system 130 can be implemented locally on the system 102. Additionally or alternatively, an offline mode may be offered, where once the computer system 130 generates the response data 114, this response data 114 is cached locally to the system 102 and used in case a data connection of the system 102 to the computer system 130 is subsequently lost.

Figure 2:
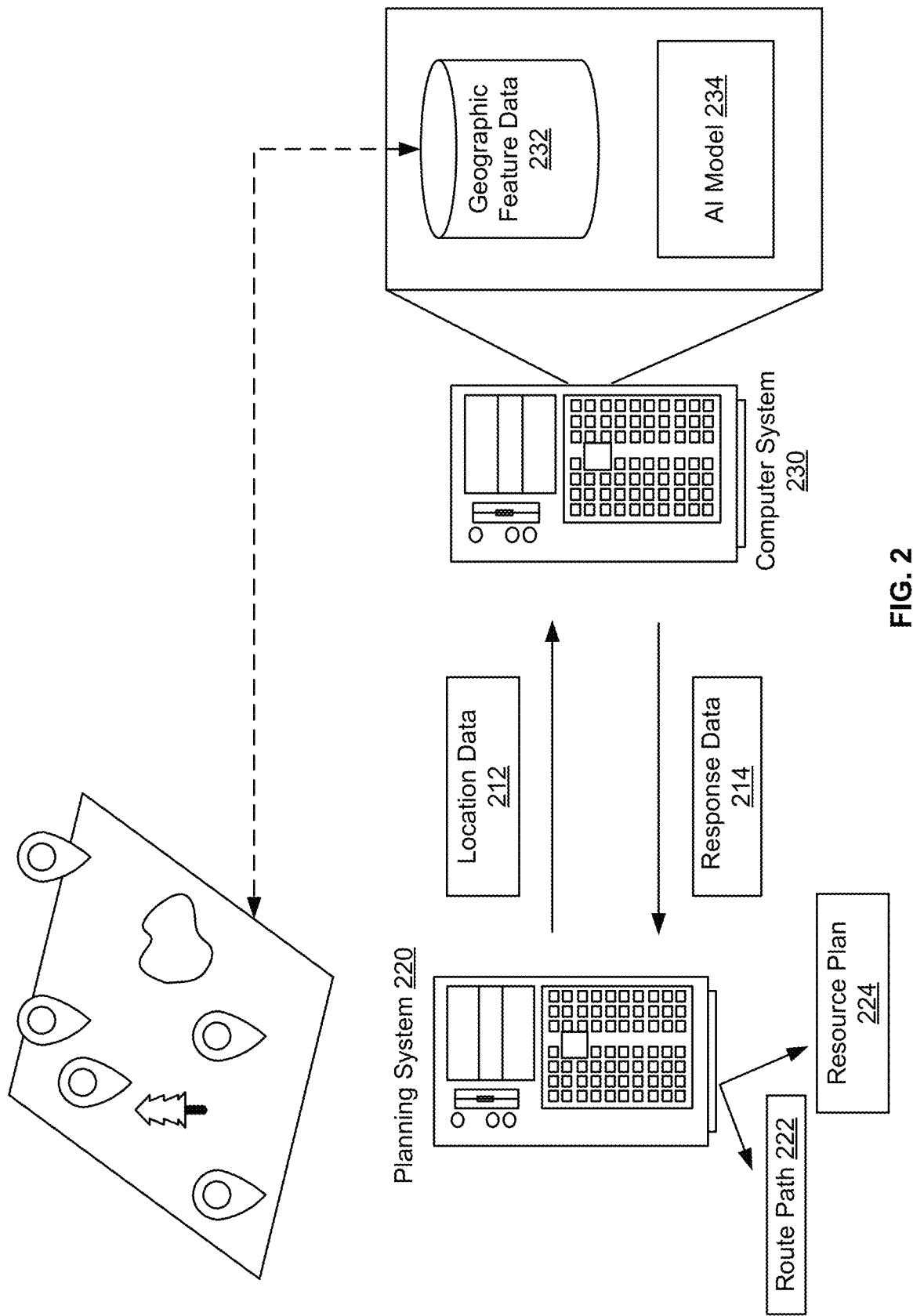
FIG. 2 illustrates an example of route and resource planning from travel time estimation, according to embodiments of the present disclosure.

FIG. 2 illustrates an example of route and resource planning from travel time estimation according to embodiments of the present disclosure. A planning system 220, which can determine routes and resources for providing item deliveries to multiple locations can provide location data 212 to a computer system 230, which is an example of the computer system 130 in FIG. 1. The location data 212 can include location coordinates (e.g., GPS coordinates) of parking locations and item delivery locations where items are to be delivered within a time interval (e.g., day, week, etc.).

The computer system 230 can determine a travel path between a first location and a second location, and the travel path can include a travel segment. Upon determining the travel segment, the computer system 230 can access geographic feature data 232 to identify a geographic feature that is associated with the travel segment. The geographic feature data 232 can indicate a type of the travel segment (e.g., park, sidewalk, etc.), a distance range of the travel segment (e.g., to account for the fact that a user has freedom to travel any desired way throughout a park), image data that corresponds to the travel segment, obstacle data of a travel obstacle in an area that contains the travel segment, or elevation data of the travel segment.

The computer system 230 uses an AI model 234 to determine response data 214 that includes a travel time between the first location and the second location. The geographic feature data 232 associated with the travel segment is input to the AI model 234, which is trained to predict travel times. In some examples, the AI model 234 also receives a haversine distance between the first location and the second location, a pedestrian network model-predicted travel time between the first location and the second location, and the travel path as inputs, user-related data, item-related data, and/or environmental data. The AI model 234 outputs an indication of the travel time, which is included in response data 214 to the planning system 220.

The planning system 220 can determine a candidate delivery route that includes the first location, the second location, and the travel path between the first location and the second location. The planning system 220 determines a total travel time of the candidate delivery route based on the travel time indicated in the response data 214. The total travel time for the candidate delivery route can be based on a travel time determined by the AI model 234. The planning system 220 can also determine total travel times for other delivery routes that include the first location and the second location. The other item delivery locations and sequence of item delivery locations can differ for each of the candidate delivery routes. The planning system 220 can then select, based at least in part on the total travel time, the candidate delivery route as a delivery route from the candidate delivery routes. For instance, the planning system 220 can select the delivery route to be the candidate delivery route with the shortest total travel time. The selected delivery route can correspond to route path 222.

Upon determining delivery routes between various locations of item deliveries, the planning system 220 can then determine, for each one of the delivery routes, a corresponding total delivery time generated based at least in part on the AI model 234. The planning system 220 can allocate one or more resources to the delivery routes based on the total delivery times. For example, the resources can include a number of delivery drivers, a type of delivery modes, a number of shifts for the delivery routes, etc. The one or more resources can be indicated in a resource plan 224 generated by the planning system 220.

Figure 3:
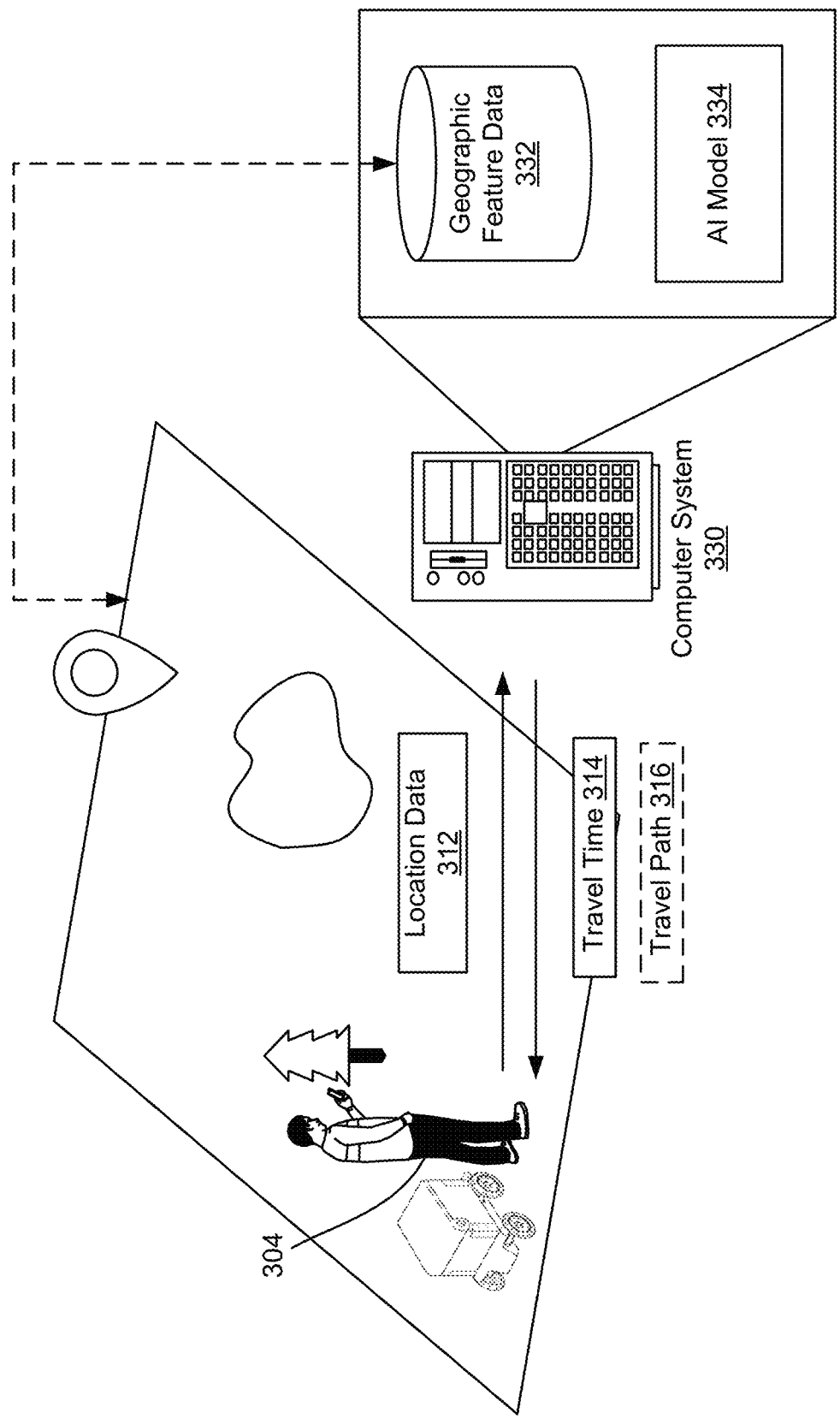
FIG. 3 illustrates an example of using a travel time estimation, according to embodiments of the present disclosure.

FIG. 3 illustrates an example of using a travel time estimation, according to embodiments of the present disclosure. A computer system 330, which is an example of the computer system 130 in FIG. 1, can receive, from a mobile device that is associated with a user account of a user 304 (or unmanned vehicle) and that is executing a delivery application, location data 312 with a request of the delivery application for a travel time between a current location of the mobile device and an item delivery location. The delivery route including the item delivery location can be assigned to the user account. Alternatively, the delivery application may execute offline to process delivery locations and determine travel times.

In an example, the computer system 330 determines a haversine distance between the current location and the item delivery location, a travel time generated by a pedestrian network model, a travel path between the current location and the item delivery location, and geographic feature data 332 indicating a geographic feature of a travel segment along the travel path. The computer system 330 may also determine user account data based on the user account to which the delivery route is assigned. The user account data can include a driver profile about past deliveries performed by the user, a tenure of the user, etc. In addition, the computer system 330 can determine item data based on an item to be delivered to the second item delivery location. For instance, the item data can be a size of the item, a weight of the item, and the like. The computer system 330 can also determine environmental data associated with the travel path, such as weather conditions expected during a time of delivery.

The computer system 330 generates an input to an AI model 334 based on the haversine distance, the travel time, the travel path, and the geographic feature data 332. The input may also be based on the user account data, the item data, and the environmental data. Based on an output of the AI model 334, the computer system 330 determines a travel time 314 between the current location and the item delivery location. The computer system 330 sends response data indicating the travel time 314 to the mobile device, which causes the delivery application to present the travel time 314 in association with the current location of the mobile device and the item delivery location.

The computer system 330 may additionally determine a travel path 316, that can also be indicated in the response data 314. For instance, the travel path 316 is an output of the pedestrian network model and may have been used in estimating the travel time 314. The computer system 330 sends the travel path 316 to the mobile device, which causes the delivery application to present the travel time 314 in association with the travel path 316 (e.g., on a map).

Figure 4:
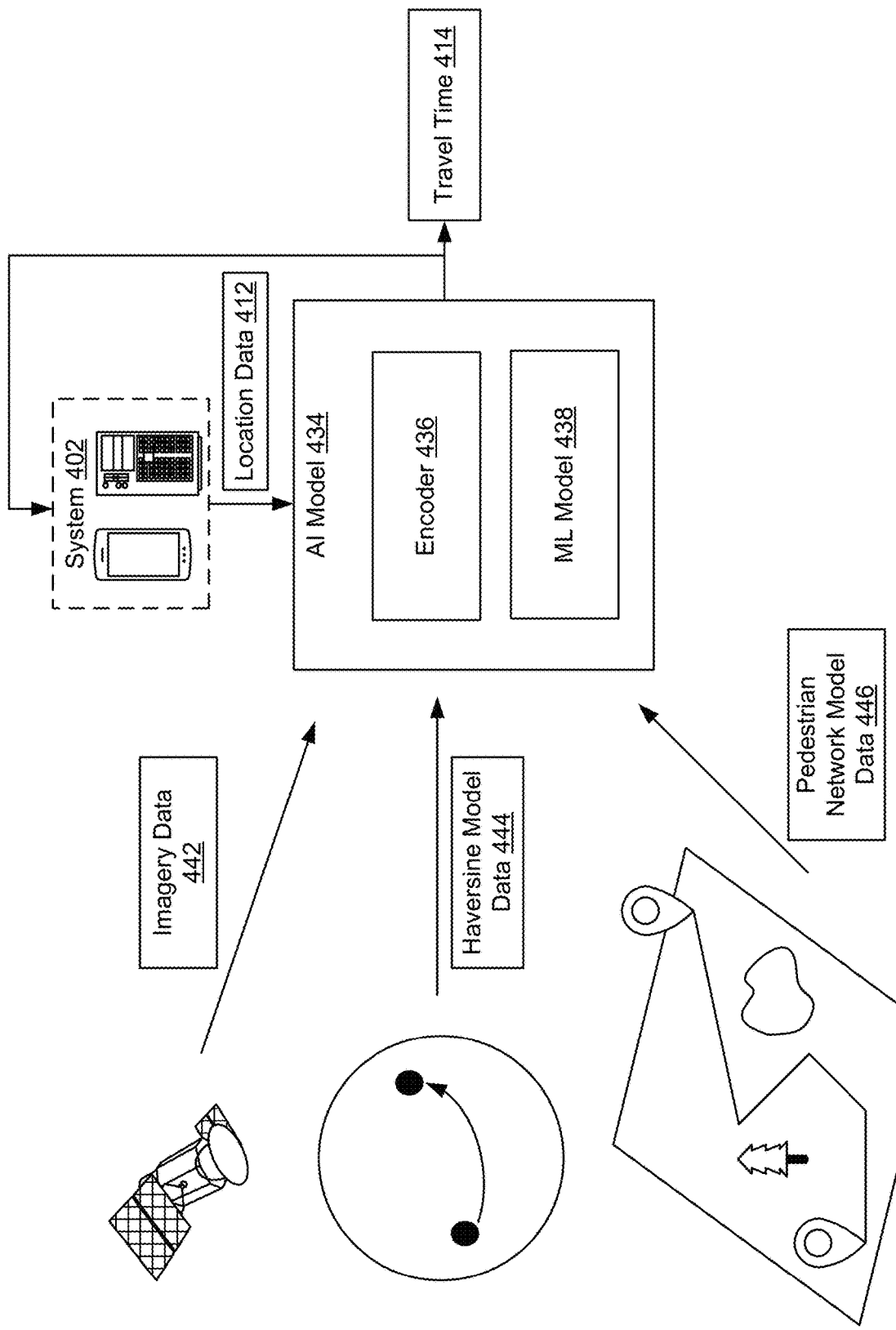
FIG. 4 illustrates an example of an artificial intelligence model for travel time estimation, according to embodiments of the present disclosure.

FIG. 4 illustrates an example of an AI model 434 for travel time estimation, according to embodiments of the present disclosure. The AI model 434 is an example of the AI model in the previous figures. The AI model 434 receives location data 412 from a system 402 (e.g., user device or planning system) and outputs a travel time 414 between a first location and a second location.

In an example, the AI model 434 can also receive imagery data 442, haversine model data 444, and pedestrian network model data 446 as inputs. The imagery data 442 may include satellite imagery data, aerial imagery data (e.g., captured from an airplane), or terrestrial imagery data (e.g., captured from a terrestrial vehicle). Imagery data can include images, where such images can be processed to detect travel paths and their types, distance ranges, obstacles, and the like. The imagery data can additionally or alternatively include other types of data that indicate a geographic feature, such as elevation data indicating an elevation between two points. The haversine model data 444 can be a haversine distance between the first location and the second location determined by a haversine model. The haversine model determines a great-circle distance between two points on a sphere given their longitudes and latitudes. The haversine model is a specific case of the law of haversines, which relates sides and angles of spherical triangles. The pedestrian network model data 446 can include a travel time between the first location and the second location predicted by a pedestrian network model. Additionally, the pedestrian network model data 446 can include a total distance of pedestrian network model-predicted travel segments of a travel path between the first location and the second location, and types of the pedestrian network model-predicted travel segments. The pedestrian network model can use a shortest path algorithm that snaps the locations to the arcs in a connected road network graph, and calculates the shortest path between the snapped positions. Although not shown in FIG. 4, the shortest path or the estimated travel path of the pedestrian network model often follows road segments, such as around a perimeter of a park, which can lead to suboptimal estimations of the travel time. This path may not be the actual path that a user actually follows and, thus, the travel time estimated by the pedestrian network model may not be as accurate as the travel time estimated using embodiments of the present disclosure. If no pedestrian network model data 446 is available for a travel segment of the travel path, the travel segment can be represented as a shortest distance between a start point and an end point of the travel segment. Although not illustrated in FIG. 4, other types of input can be additionally or alternatively provided to the AI model 434. For instance, such input data can include user account data, item data, and/or environmental data as described herein above in connection with FIGS. 1-3.

Upon receiving the location data 412, the imagery data 442, the haversine model data 444, the pedestrian network model data 446, and/or possibly the other types of input data, an encoder 436 of the AI model 434 can generate embedding vectors from the inputs. The embedding vectors are input into an ML model 438 of the AI model 434, and the ML model 438 outputs the travel time 414. The ML model 428 may be a linear tree model (e.g., extreme gradient boosting (XGBoost) model) or a convolutional neural network (CNN), for instance. The travel time 414 may be sent to the system 402 for use in route planning, resource planning, or to indicate to a user the travel time 414 for an item delivery.

Training the AI model 434 can involve determining training data. In the interest of clarity of explanation, the training data here is described in connection with an actual past delivery performed by a user. However, the training data generally includes data related to multiple past deliveries of the user and of other users. The full set of such data is input to the AI model 334 during the training such that the AI model's 334 parameters are updated by performing travel time predictions and minimizing a loss function across the full data set. Referring to the training data collected based on a past delivery of a user, this training data includes an actual travel time (e.g., time between consecutive deliveries, which can be determined based on delivery scan events in a vehicle stop) and an actual travel path associated with a previous travel between locations (which can be determined based on GPS data) of the past delivery. The training data may also include imagery data of an area containing the actual travel path, environmental data associated with the actual travel path, user account data associated with the actual travel path, and/or item data associated with the actual travel path. During training, the training data is provided to the AI model 434 and a loss function is minimized (e.g., via a gradient descent backpropagation algorithm). The loss function can include, for an actual travel path, a difference between an actual travel time of this travel path and a predicted travel time. The training refines the parameters of the ML model 438 to minimize this difference such that the ML model 438 can estimate the predicted travel time as accurately as possible.

Figure 5:
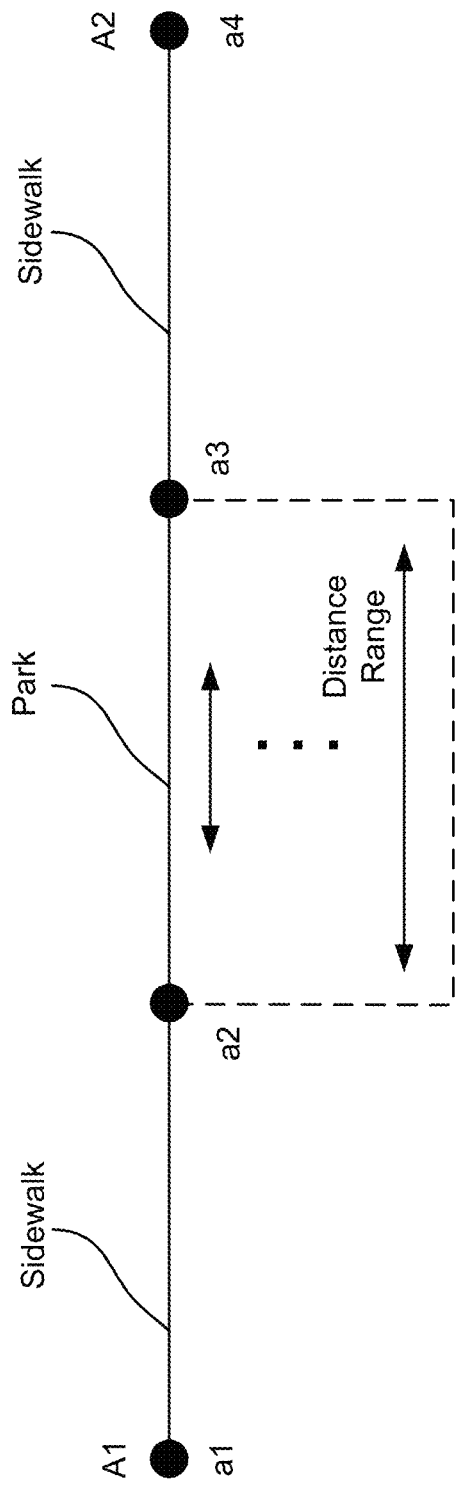
FIG. 5 illustrates an example of a variable travel path, according to embodiments of the present disclosure.

FIG. 5 illustrates an example of a variable travel path, according to embodiments of the present disclosure. The variability here relates to a distance range between two points along the travel path. This distance range can be a geographic feature used as part of the input to an AI model that predicts the travel time along the travel path, while accounting for the variability of traveling between the two points.

As illustrated, Location A1 is a first location and location A2 is a second location. A user can travel from A1 to A2 to deliver an item at A2. The travel path between A1 and A2 is illustrated as including three travel segments: a1 to a2, a2 to a3, and a3 to a4. A travel time between the A1 and A2 may be based on the types of the travel segments. For instance, segments a1 to a2 and a3 to a4 are illustrated as being sidewalks and segment a2 to a3 is illustrated as being a park. The length of the sidewalks is fixed (e.g., does not change, so that the distance range between a1 and a2 is fairly narrow), but the length of the path traveled by the user through the park is variable (e.g., the distance range between a2 and a3 is fairly large, where the difference between the lower bound and upper bound of this distance range exceeds a predefined threshold, such as a ten percent or some other predefined percentage value). For instance, the user may cut straight across the park travelling the shortest distance possible, or the user may weave back and forth across the park and travel a much longer distance. So, the type of travel segment and the distance range of the travel segment may be used as inputs (e.g., geographic feature inputs) to the AI model when determining a travel time between location A1 and A2.

Figure 6:
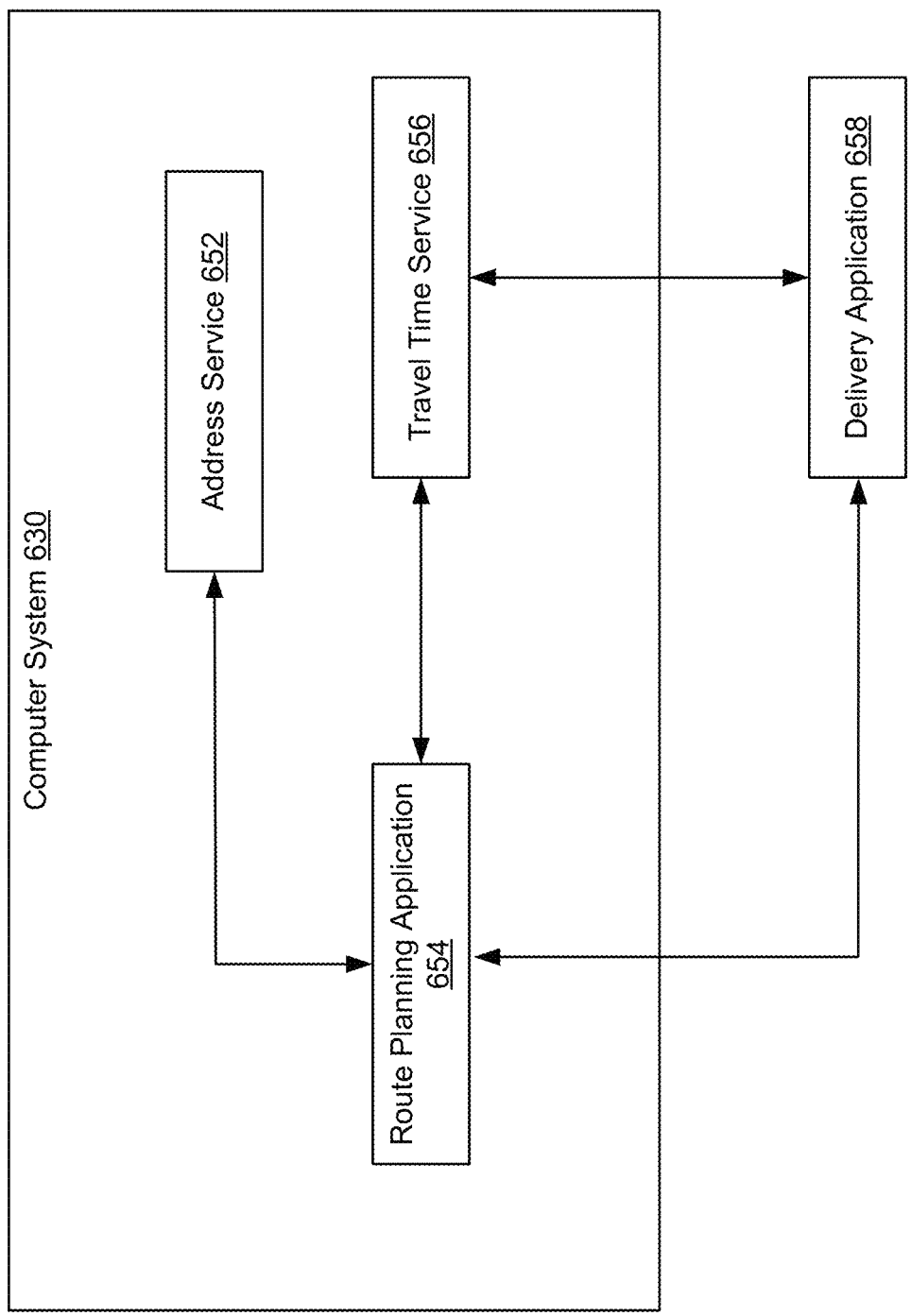
FIG. 6 illustrates an example of a computer system for route planning based on travel time estimation, according to embodiments of the present disclosure.

FIG. 6 illustrates an example of a computer system 630 for route planning based on travel time estimation, according to embodiments of the present disclosure. The computer system 630 may be an example of the computer system 130 or the planning system 120 in FIG. 1. The computer system 630 includes an address service 652 that stores locations to which items are to delivered and associated parking locations. The address service 652 sends GPS data for the locations to a route planning application 654, which determines a particular route for a sequence of the locations. The route planning application 654 may receive travel times between locations from a travel time service 656, which may use an AI model to determine travel times between pairs of locations. To determine the route, the route planning application 654 can select a route with a shortest total travel time, where the total travel time is a sum of individual travel times between the various locations. In some instances, the route planning application 654 may also determine travel paths between each location.

Generally, a delivery route can include an ordered sequence of locations, starting and ending at the same location, and connecting delivery locations in between. Optionally, the delivery route can further include a travel path between two connected locations.

In an example, the route planning application 654 and/or the travel time service 656 can communicate with a delivery application 658 via an application programming interface (API). The delivery application 658 can be executed on a user device associated with a user account for delivering the items to the locations. The route planning application 654 can communicate the delivery route to the delivery application 658. If the user deviates from the delivery route, the delivery application 658 can send an updated current location and remaining delivery locations to the route planning application 654, which can communicate with the travel time service 656 to determine an updated travel time and send the updated travel time to the delivery application 658.

Figure 7:
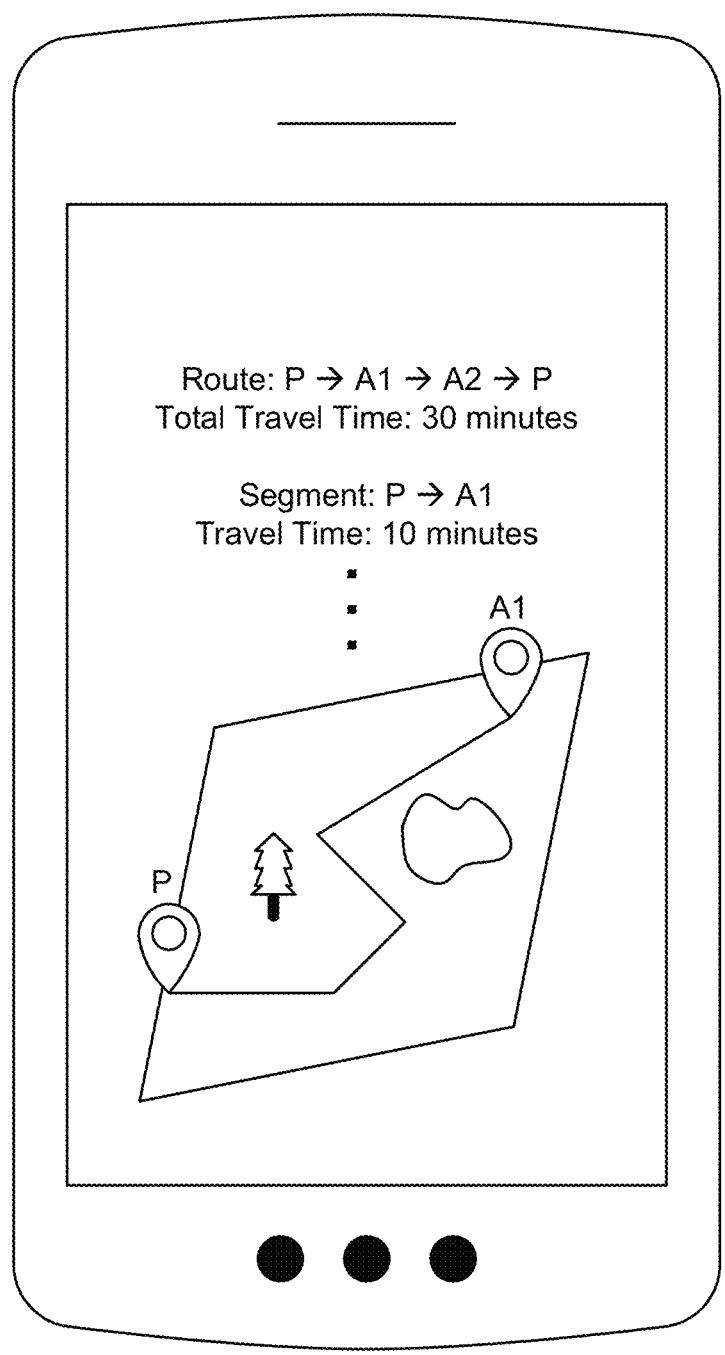
FIG. 7 illustrates an example of displaying a travel time at a user device, according to embodiments of the present disclosure.

FIG. 7 illustrates an example of displaying a travel time at a user device 710, according to embodiments of the present disclosure. The user device 710 displays a total travel time of a delivery route and travel times between each location of the delivery route. Each of the travel times can be determined by an AI model, such as the AI model previously described herein.

The delivery route includes a sequence of P→A1→A2→P, indicating that the route starts and ends at a parking location and includes a first delivery location A1 that follows the start at the parking location, a second delivery location A2 that follows the first delivery location, and finally that the parking location is to be returned to after the delivery location A2. The user device 710 displays the sequence and the total travel time. Between each of the connected locations, there may be a travel path that has its own estimated travel time.

As illustrated, the user device 710 also displays a map indicating a travel path from the parking location P to the first delivery location A1 and indicates the travel time along this path. Once the user reaches A1 and performs an item delivery, the display of the user device 710 can be updated to display a travel path from the first delivery location A1 to the second delivery location A2, and so on.

The delivery route data can be sent to the user device 710 from a route planning system that executes a route planning application (e.g., the computer system 630 executing the route planning application 654). This system can determine the travel time by requesting its estimation (e.g., via an application programming interface (API) call) from a travel time service (e.g., the travel time service 656) that then sends respond data indicating the travel time between each pair of two connected locations. Further, the response data can indicate the travel path (in case a deviation from the original travel path is determined) between each pair.

Figure 8:
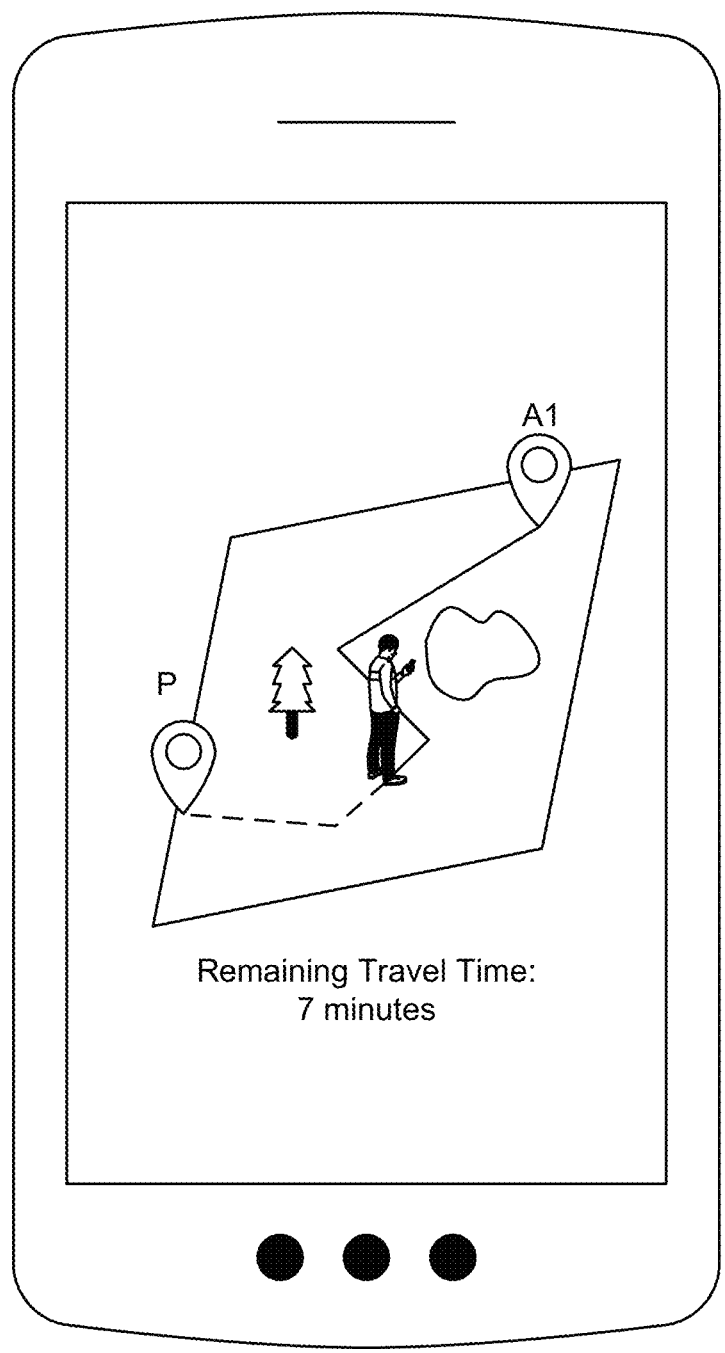
FIG. 8 illustrates an example of updating a display of a travel time at a user device, according to embodiments of the present disclosure.

FIG. 8 illustrates an example of updating a display of a travel time at a user device 810 during an item delivery, according to embodiments of the present disclosure. The display includes a map indicating a travel path from a parking location P to a first delivery location A1, which can be a same travel path as shown in FIG. 7. As a user travels along the travel path, a current location of the user device 810 can be updated on the map. Additionally, as the user approaches A1, the remaining travel time can decrease from the original travel time for this P→A1 portion of the route. The travel time can be updated by sending the user device's 810 current location to a travel time service (e.g., the travel time service 656) that then sends respond data indicating the remaining travel time. Further, the response data can indicate the remaining portion of the travel path (in case a deviation from the original travel path is determined) or the user device 810 itself can update the remaining portion of the travel path (in case no deviation exists) based on its location data (e.g., GPS coordinates).

FIGS. 9-12 illustrate example flows for processes associated with AI model based travel time estimation. Operations of the flows can be performed by a computer system, such as the computer system 130. Some or all of the instructions for performing the operations can be implemented as hardware circuitry and/or stored as computer-readable instructions on a non-transitory computer-readable medium of computer system. As implemented, the instructions represent modules that include circuitry or code executable by processor(s) of the computer system. The use of such instructions configures the computer system to perform the specific operations described herein. Each circuitry or code in combination with the relevant processor(s) represent a means for performing a respective operation(s). While the operations are illustrated in a particular order, it should be understood that no particular order is necessary and that one or more operations may be omitted, skipped, performed in parallel, and/or reordered.

Figure 9:
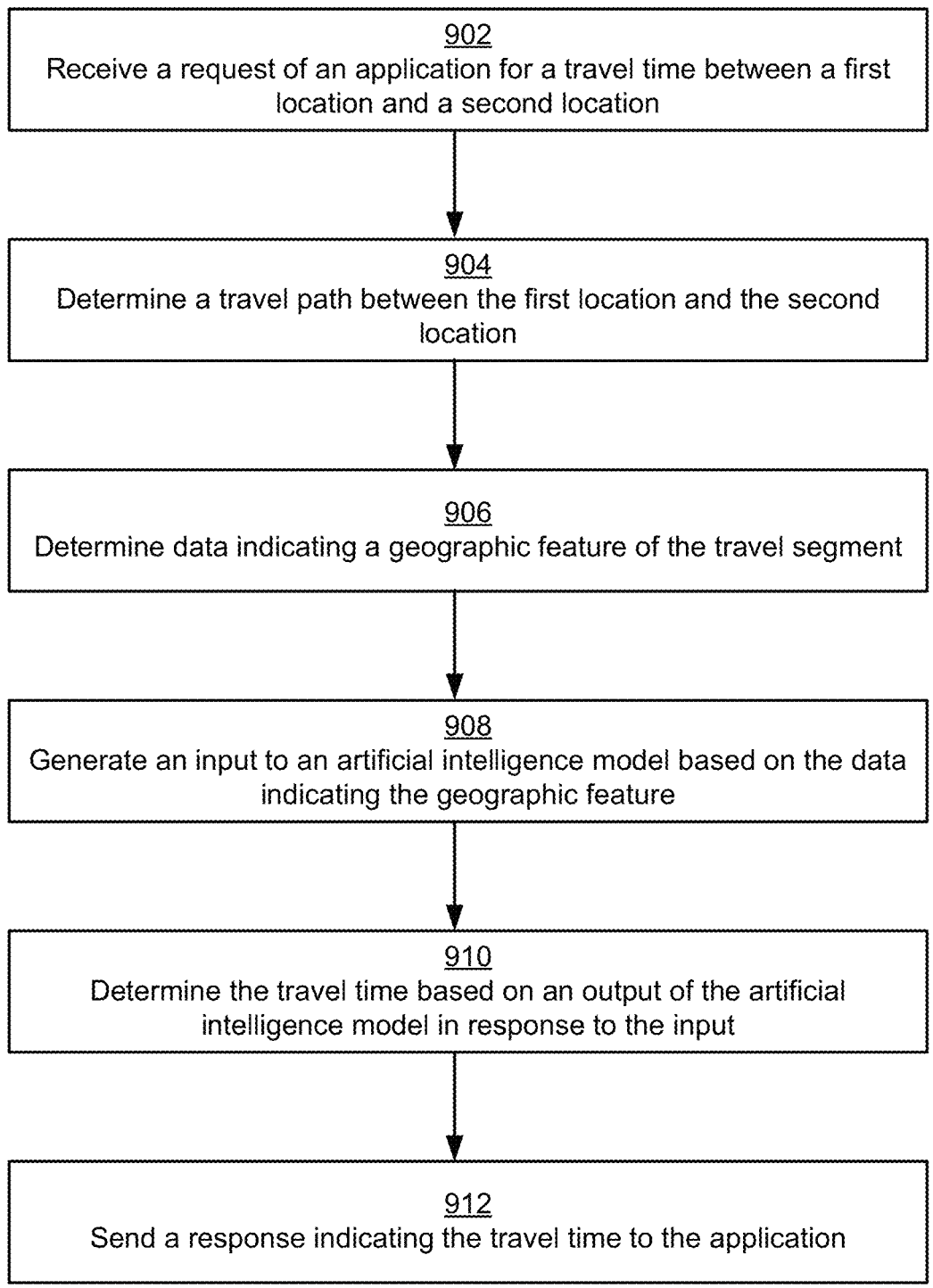
FIG. 9 illustrates an example of a flow for artificial intelligence model-based travel time estimation, according to embodiments of the present disclosure.

FIG. 9 illustrates an example of a flow for artificial intelligence model-based travel time estimation, according to embodiments of the present disclosure. In an example, the flow includes operation 902, where the computer system receives a request of an application for a travel time between a first location and a second location. The application can be, for instance, a route planning application or a delivery application. The first location can be a first item delivery location and the second location can be a second item delivery location, where these delivery locations are indicated in the request.

In an example, the flow includes operation 904, where the computer system determines a travel path between the first location and the second location. The travel path can include a travel segment. The travel path may be determined based on a pedestrian network or imagery data.

In an example, the flow includes operation 906, where the computer system determines data indicating a geographic feature of the travel segment. The geographic feature may be a type of the travel segment, a distance range of the travel segment, image data that corresponds to the travel segment, obstacle data of a travel obstacle in an area that contains the travel segment, or elevation data of the travel segment. The geographic feature may be determined based on satellite images, aerial images, terrestrial images, or Lidar data.

In an example, the flow includes operation 908, where the computer system generates an input to an AI model based on the data indicating the geographic feature. The AI model is trained to predict travel times. In addition to the data indicating the geographic feature, a haversine distance between the first location and the second location, a pedestrian network model-predicted travel time between the first location and the second location, the travel path, a total distance of pedestrian network model-predicted travel segments of the travel path, types of the pedestrian network model-predicted travel segments, user account data, item data, and/or environmental data can be included in the input to the AI model.

In an example, the flow includes operation 910, where the computer system determines the travel time based on an output of the AI model in response to the input. The output indicates the travel time between the first location and the second location.

In an example, the flow includes operation 912, where the computer system sends a response indicating the travel time to the application. The application can then present the travel time. The response can also include the travel path. In this case, the application can also present the travel path. The computer system may determine an estimated delivery time for the item based on the travel time and send an indication of the estimated delivery time of the item to a device associated with a customer receiving the item.

Figure 10:
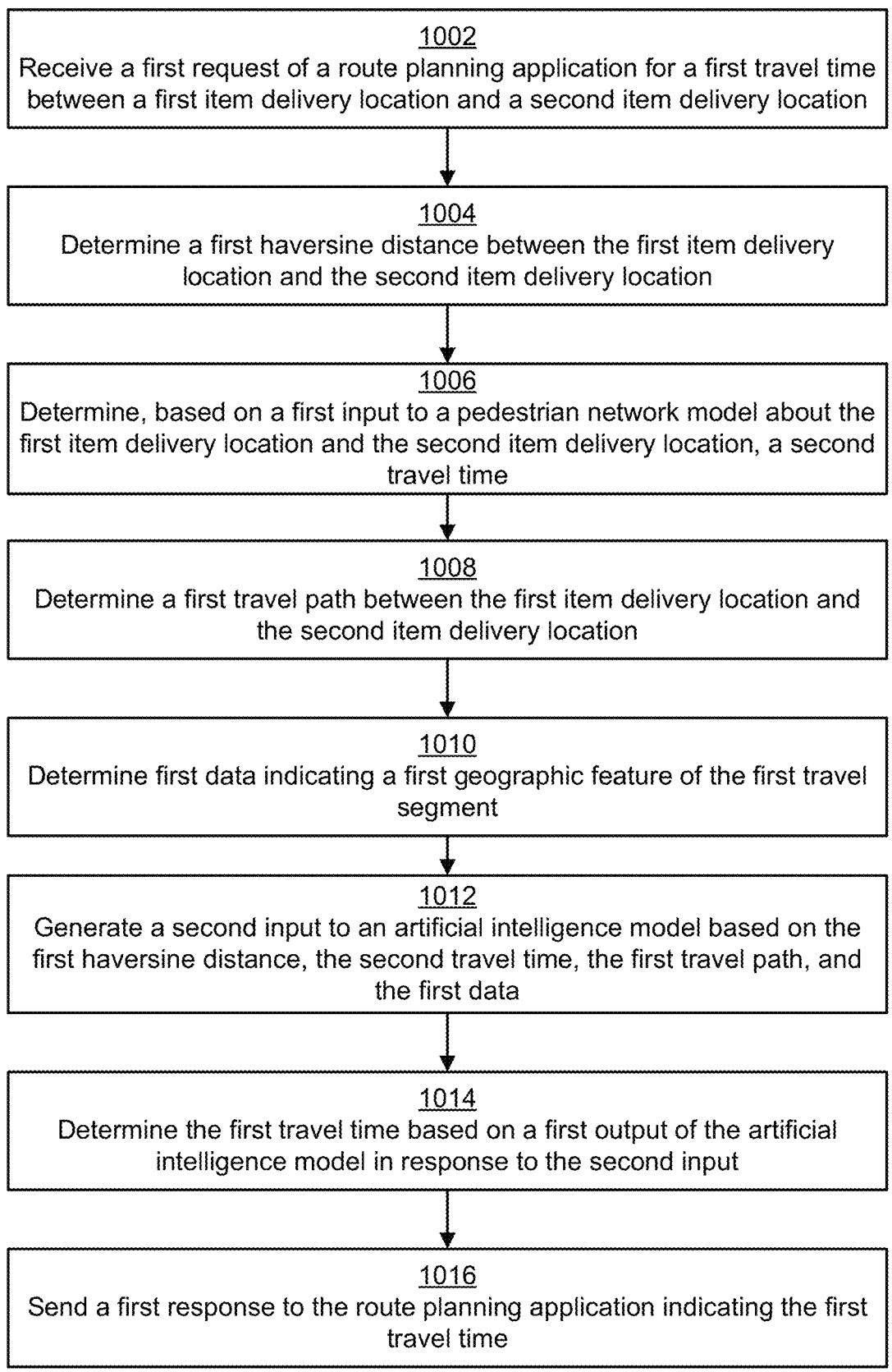
FIG. 10 illustrates another example of a flow for artificial intelligence model-based travel time estimation, according to embodiments of the present disclosure.

FIG. 10 illustrates another example of a flow for artificial intelligence model-based travel time estimation, according to embodiments of the present disclosure. In an example, the flow includes operation 1002, where the computer system receives a first request of a route planning application for a first travel time between a first item delivery location and a second item delivery location. This application can indicate a plurality of locations including the first item delivery location and the second item delivery locations by including location data of each of these locations (e.g., the corresponding GPS coordinates).

In an example, the flow includes operation 1004, where the computer system determines a first haversine distance between the first item delivery location and the second item delivery location. The computer system can use a haversine model to determine the first haversine distance.

In an example, the flow includes operation 1006, where the computer system determines, based on a first input to a pedestrian network model about the first item delivery location and the second item delivery location, a second travel time. The second travel time is a pedestrian network model-predicted travel time for traveling a total distance of pedestrian network model-predicted travel segments of a travel path that connects the first delivery location and the second delivery location.

In an example, the flow includes operation 1008, where the computer system determines a first travel path between the first item delivery location and the second item delivery location. The first travel path can include a first travel segment (e.g., one of the network model-predicted travel segments), where this segment allows a freedom of movement there along. For instance, the first travel segment can between a first location and a second location separated by a park, where the park can be traveled along different ways that connect these two locations.

In an example, the flow includes operation 1010, where the computer system determines first data indicating a first geographic feature of the first travel segment. The geographic feature may be a type of the first travel segment, a distance range of the first travel segment, image data that corresponds to the first travel segment, obstacle data of a travel obstacle in an area that contains the first travel segment, and/or elevation data of the first travel segment. The geographic feature may be determined based on satellite imagery, aerial imagery, terrestrial imagery, and/or Lidar data.

In an example, the flow includes operation 1012, where the computer system generates a second input to an AI model based on the first haversine distance, the second travel time, the first travel path, and the first data. The AI model is trained to predict travel times. An encoder of the AI model can generate an embedding vector from the first haversine distance, the second travel time, the first travel path, and the first data, and the embedding vector can be the second input to the AI model. As explained herein above, other input data is possible and can be similarly encoded, such as user account data, item data, and/or environmental data.

In an example, the flow includes operation 1014, where the computer system determines the first travel time based on a first output of the AI model in response to the second input. The first output indicates the first travel time between the first item delivery location and the second item delivery location.

In an example, the flow includes operation 1016, where the computer system sends a first response to the route planning application indicating the first travel time. A delivery route that includes the first item delivery location and the second item delivery location is generated by the route planning application based on the first travel time. For example, the route planning application can determine total travel times for delivery routes involving various sequences of traveling between the first item delivery location and the second item delivery location and other item delivery locations. The route planning application can select the delivery route to be the delivery route which is determined to have the shortest total travel time.

Figure 11:
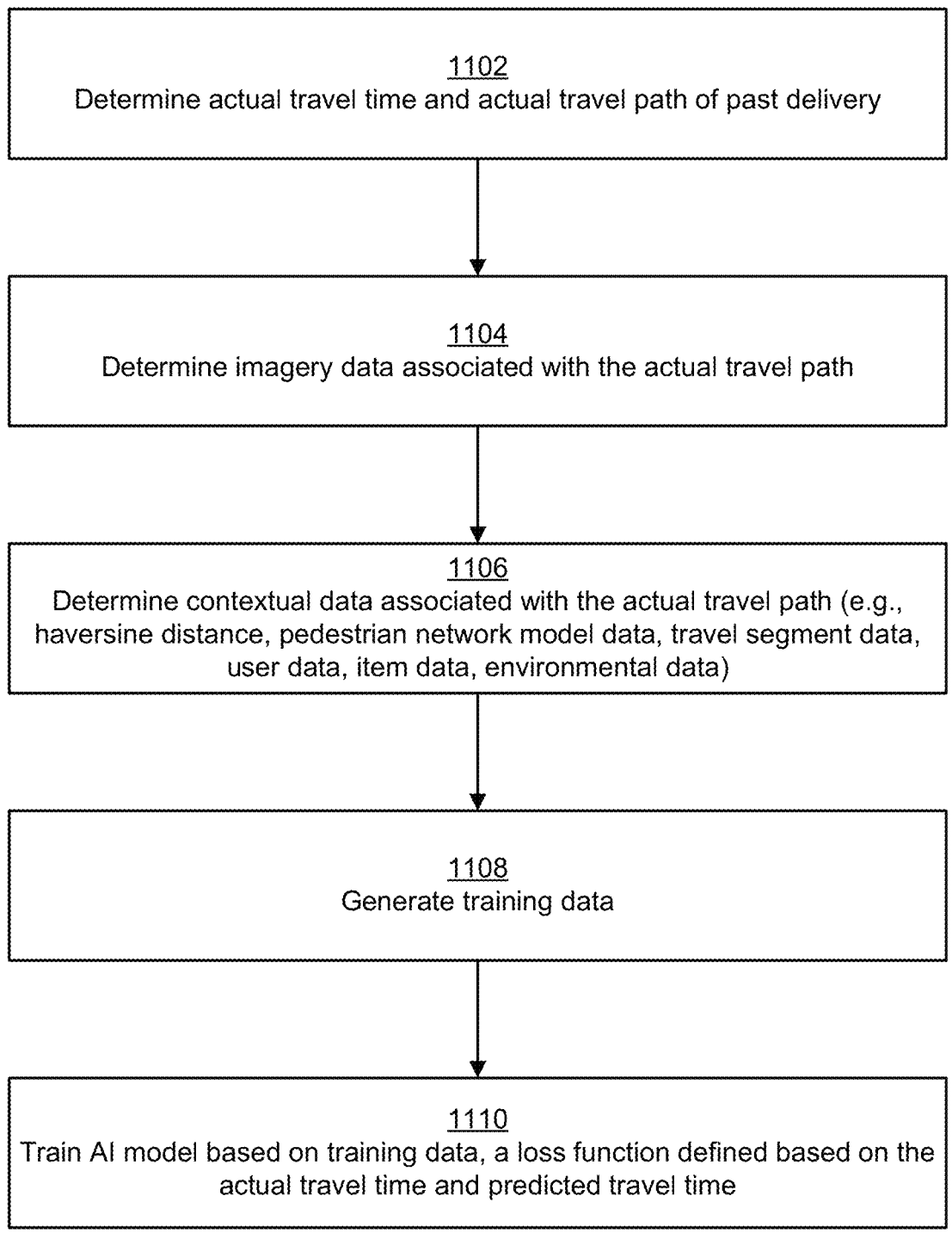
FIG. 11 illustrates an example of a flow for training an artificial intelligence model for travel time estimation, according to embodiments of the present disclosure.

FIG. 11 illustrates an example of a flow for training an artificial intelligence model for travel time estimation, according to embodiments of the present disclosure. As indicated herein above, the training generally involves training data related to past deliveries of multiple users. In the flow of FIG. 11, particular operations are described in connection with a past delivery of a single user. Such operations can be similarly repeated for other past deliveries. In an example, the flow includes operation 1102, where the computer system determines an actual travel time and an actual travel path of a past delivery. The actual travel time and the actual travel path can be stored after the past delivery and accessed by the computer system.

In an example, the flow includes operation 1104, where the computer system determines imagery data associated with the actual travel path. The imagery data may be one or more of satellite imagery of an area containing the actual travel path, aerial imagery of the area, or terrestrial imagery of the area.

In an example, the flow includes operation 1106, where the computer system determines contextual data associated with the actual travel path. The contextual data can be one or more of segment types associated with the actual travel path, environmental data associated with the actual travel path, user account data associated with the actual travel path, and/or item data associated with the actual travel path.

In an example, the flow includes operation 1108, where the computer system generates training data. The training data includes the actual travel time and the actual travel path. Optionally, the input can also include the imagery data and/or the contextual data associated with the actual travel path. The training data also includes actual travel times, actual travel paths, multiple imagery data, and multiple contextual data corresponding to the other past deliveries.

In an example, the flow includes operation 1110, where the computer system trains an AI model based on the training data. A loss function for training the AI model is based on pairs of actual travel time and predicted travel time. The actual travel time of a pair is used as a ground truth for the pair during training. For each pair, the loss function computes an error between the actual travel time and the predicted travel time and parameters of the AI model are updated iteratively using a backpropagation algorithm to minimize the loss function across the different pairs of actual travel time-predicted travel time.

Certain embodiments of the present disclosure may involve storing and using travel data associated with a person or device (e.g., user account data or device data). Storage and/or use of such travel data may be controlled by a user using privacy controls associated with a device and/or a companion application associated with a device. Accordingly, users may opt out of storage of travel data and/or may select particular types of travel data that may be stored while preventing aggregation and storage of other types of travel data. Additionally, aggregation, storage, and use of travel data, as described herein, may be compliant with privacy controls, even if not technically subject to them, to bolster user trust. For example, travel and other data described herein may be treated as if it fell under acts and regulations, such as the Health Insurance Portability and Accountability Act (HIPAA) and the General Data Protection Regulation (GDPR), even if it does not actually fall under these acts and regulations.

Figure 12:
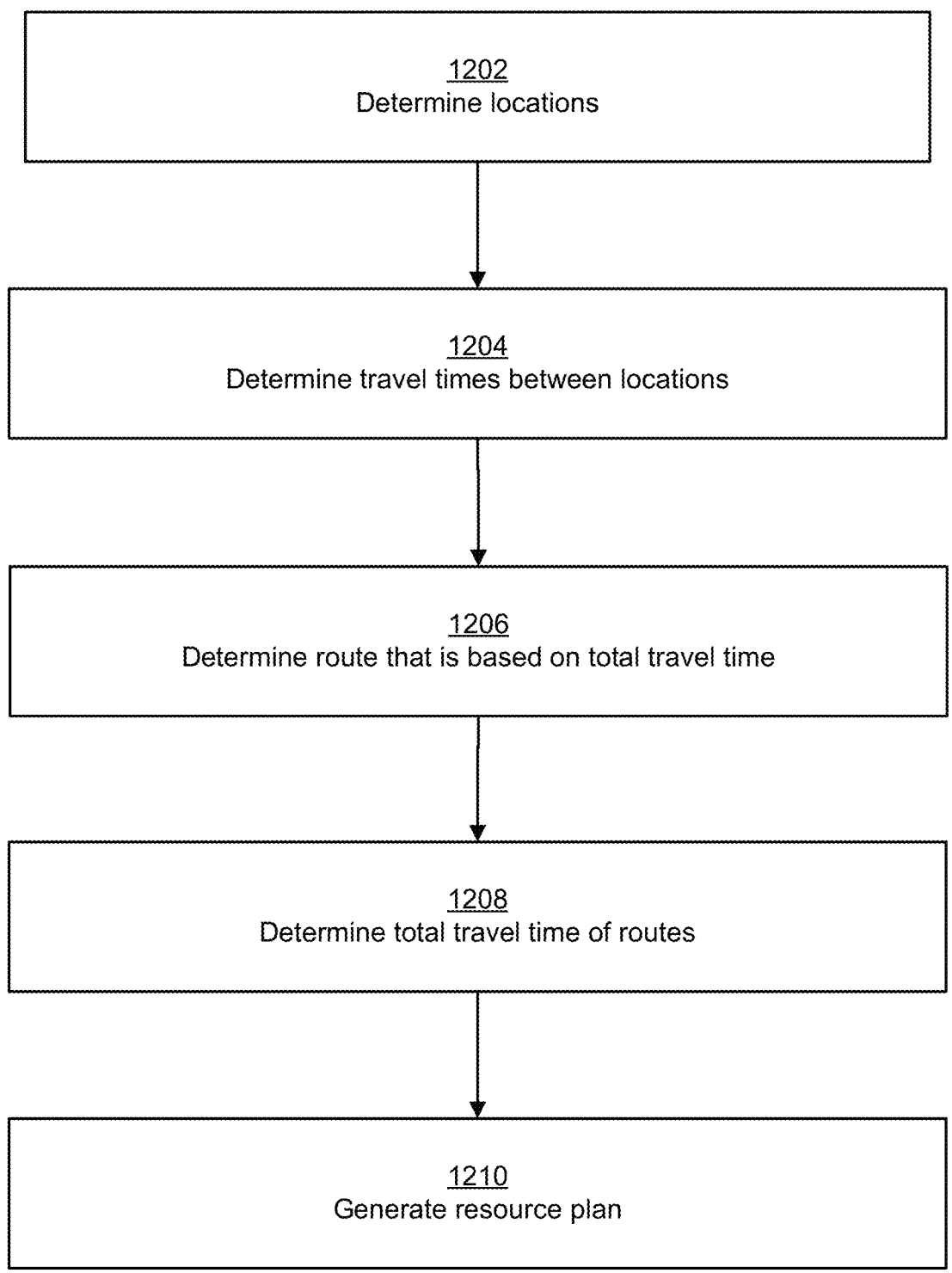
FIG. 12 illustrates an example of a flow for generating a resource plan for item deliveries, according to embodiments of the present disclosure.

FIG. 12 illustrates an example of a flow for generating a resource plan for item deliveries, according to embodiments of the present disclosure. In an example, the flow includes operation 1202, where the computer system determines locations. The locations are item delivery locations where items are to be delivered in a particular time period. The locations can also include parking locations associated with the item delivery locations.

In an example, the flow includes operation 1204, where the computer system determines travel times between locations. The computer system can include an AI model that determines travel times between locations. The computer system can then determine total travel times for different candidate delivery routes, which correspond to different combinations of location sequences.

In an example, the flow includes operation 1206, where the computer system determines a route that is based on the total travel time. The computer system selects the candidate delivery route that is associated with the shortest total travel time as the route.

In an example, the flow includes operation 1208, where the computer system determines a total travel time of routes. The computer system determines multiple delivery routes that include the delivery route. The computer system then determines, for each one of the multiple delivery routes, a corresponding total delivery time generated based on the AI model. The computer system can sum the total times of the delivery routes generated by the AI model to determine the total time of the multiple delivery routes.

In an example, the flow includes operation 1210, where the computer system generates a resource plan. The resource plan can include an allocation of drivers and delivery blocks for delivery routes within a reasonable distance based on the total travel times for the delivery routes.

Figure 13:
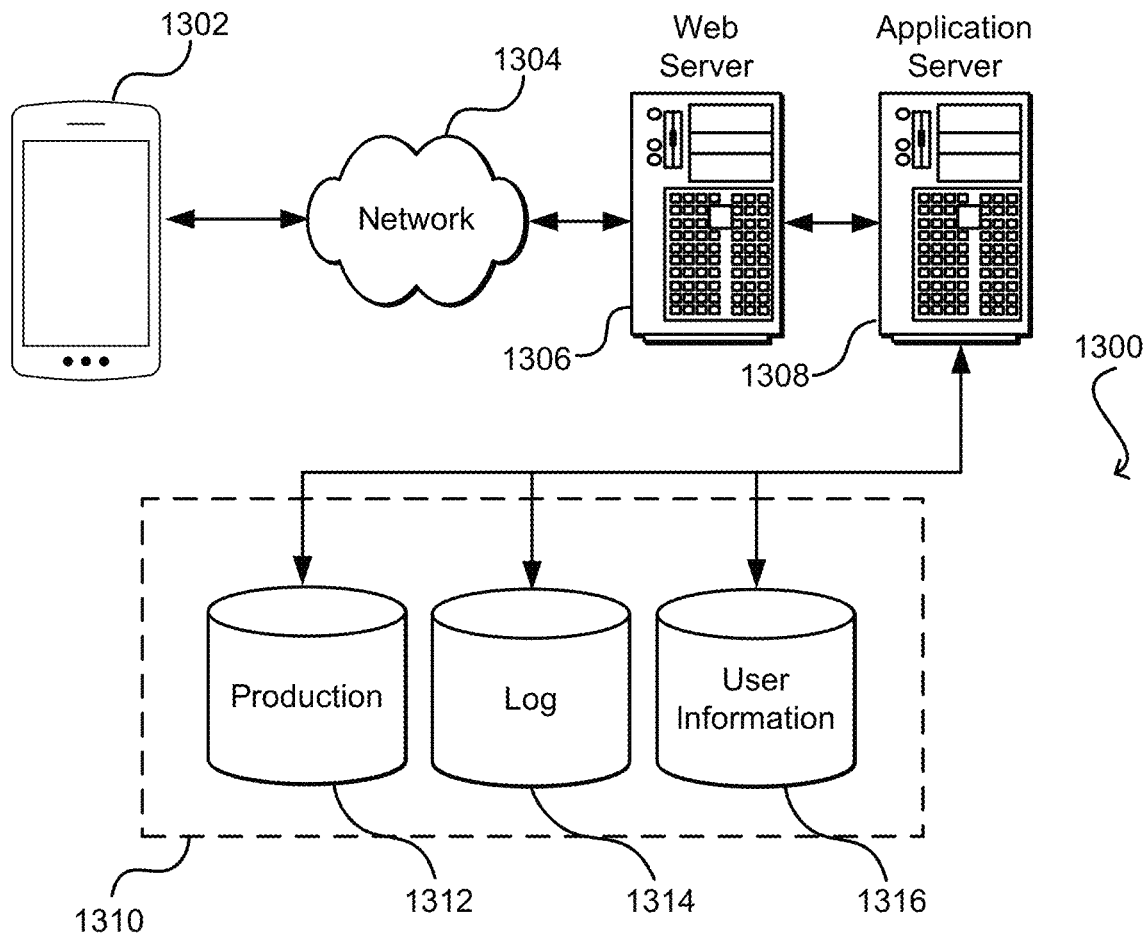
FIG. 13 illustrates aspects of an example environment for implementing aspects in accordance with various embodiments.

FIG. 13 illustrates aspects of an example environment 1300 for implementing aspects in accordance with various embodiments. As will be appreciated, although a Web-based environment is used for purposes of explanation, different environments may be used, as appropriate, to implement various embodiments. The environment includes an electronic client device 1302, which can include any appropriate device operable to send and receive requests, messages, or information over an appropriate network 1304 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1306 for receiving requests and serving content in response thereto, although for other networks an alternative device serving a similar purpose could be used as would be apparent to one of ordinary skill in the art.

The illustrative environment includes at least one application server 1308 and a data store 1310. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1302 and the application server 1308, can be handled by the Web server. It should be understood that the Web and application servers are not required and are merely example components, as structured code discussed herein can be executed on any appropriate device or host machine as discussed elsewhere herein.

The data store 1310 can include several separate data tables, databases or other data storage mechanisms and media for storing data relating to a particular aspect. For example, the data store illustrated includes mechanisms for storing production data 1312 and user information 1316, which can be used to serve content for the production side. The data store also is shown to include a mechanism for storing log data 1314, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1310. The data store 1310 is operable, through logic associated therewith, to receive instructions from the application server 1308 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1302. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the system 1300 in FIG. 13 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above.

For example, customized hardware might also be used and/or particular elements might be implemented in hardware, software (including portable software, such as applets), or both. Further, connection to other computing devices such as network input/output devices may be employed.

Computer-readable storage media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system comprising:
one or more processors; and
one or more memory storing computer-readable instructions that, upon execution by the one or more processors, configure the system to:
receive, based at least in part on a first application programing interface (API) call from a device executing a route planning application, a first request of the route planning application for a first travel time between a first item delivery location and a second item delivery location, the route planning application presenting a user interface at the device, the first API call generated based at least in part on an interaction with the user interface;
determine a first haversine distance between the first item delivery location and the second item delivery location;
determine, based at least in part on a first input to a pedestrian network model about the first item delivery location and the second item delivery location, a second travel time between the first item delivery location and the second item delivery location;
determine a first travel path between the first item delivery location and the second item delivery location, the first travel path comprising a first travel segment;
determine first data indicating a first geographic feature of the first travel segment, the first geographic feature including a distance range of a plurality of distances to travel the first travel segment;
generate, based at least in part on the first haversine distance, the second travel time, the first travel path, and the distance range, a second input to an artificial intelligence model, the artificial intelligence model trained to predict travel times;
determine the first travel time based at least in part on a first output of the artificial intelligence model in response to the second input, the first output indicating the first travel time; and send, to the device, a first response to the first API call, the first response indicating the first travel time and causing the route planning application to control an unmanned vehicle based at least in part on a delivery route and to present the first travel time at the user interface as an output of the interaction, wherein the delivery route includes the first item delivery location and the second item delivery location and is generated by the route planning application based at least in part on the first travel time and is presented at the user interface in real-time relative to the first request.

2. The system of claim 1, wherein the first data indicating the first geographic feature further includes at least one of: a type of the first travel segment, image data that corresponds to the first travel segment, obstacle data of a travel obstacle in an area that contains the first travel segment, or elevation data of the first travel segment, and wherein the first data is included in the second input to the artificial intelligence model.

3. The system of claim 1, wherein the one or more memory store further computer-readable instructions that, upon execution by the one or more processors, further configure the system to:

receive, from a mobile device associated with a user account and executing a delivery application, a second request of the delivery application for a third travel time between a current location of the mobile device and the first item delivery location, wherein the delivery route is assigned to the user account;

determine a second haversine distance between the current location and the first item delivery location, a fourth travel time generated by the pedestrian network model, a second travel path between the current location and the first item delivery location, and second data indicating a second geographic feature of a second travel segment along the second travel path;

generate a third input to the artificial intelligence model based at least in part on the second haversine distance, the fourth travel time, the second travel path, and the second data;

determine the third travel time based at least in part on a second output of the artificial intelligence model in response to the third input; and send a second response to the delivery application, the second response indicating the third travel time.

4. The system of claim 1, wherein the one or more memory store further computer-readable instructions that, upon execution by the one or more processors, further configure the system to:

determine user account data based at least in part on a user account to which the delivery route is assigned;

determine item data based at least in part on an item to be delivered to the second item delivery location; and determine environmental data associated with the first travel path;

wherein the second input is generated further based at least in part on the user account data, the item data, and the environmental data.

5. A computer-implemented method comprising:

receiving, based at least in part on a first application programing interface (API) call from a device executing an application, a request of the application for a travel time between a first location and a second location, the application presenting a user interface at the device, the first API call generated based at least in part on an interaction with the user interface;

determining a travel path between the first location and the second location, the travel path comprising a travel segment;

determining data indicating a geographic feature of the travel segment, the geographic feature including a distance range of a plurality of distances to travel the travel segment;

generating, based at least in part on the distance range, an input to an artificial intelligence model, the artificial intelligence model trained to predict travel times;

determining the travel time based at least in part on an output of the artificial intelligence model in response to the input, the output indicating the travel time; and sending, to the device, a response to the first API call, the response indicating a delivery route based at least in part on the travel time and causing the device to control an unmanned vehicle based at least in part on the delivery route.

6. The computer-implemented method of claim 5, further comprising:

determining a haversine distance between the first location and the second location; and determining, based at least in part on a pedestrian network model, a pedestrian network model-predicted travel time between the first location and the second location, wherein the input is generated further based at least in part on the haversine distance, pedestrian network model-predicted travel time, and the travel path.

7. The computer-implemented method of claim 5, further comprising:

determining, based at least in part on a pedestrian network model, a pedestrian network model-predicted travel time between the first location and the second location, a total distance of pedestrian network model-predicted travel segments of the travel path, and types of the pedestrian network model-predicted travel segments, wherein the input is generated further based at least in part on the pedestrian network model-predicted travel time, the total distance, and the types of the pedestrian network model-predicted travel segments.

8. The computer-implemented method of claim 5, further comprising:

determining a candidate delivery route that comprises the travel path, the first location, and the second location;

determining a total travel time of the candidate delivery route based at least in part on the travel time; and selecting, based at least in part on the total travel time, the candidate delivery route as a delivery route from a plurality of candidate routes that comprise the first location and the second location.

9. The computer-implemented method of claim 8, further comprising:

determining a plurality of delivery routes that comprise the delivery route;

determining, for each one of the plurality of delivery routes, a corresponding total delivery time generated based at least in part on the artificial intelligence model; and allocating one or more resources to the plurality of delivery routes based at least in part on the total delivery times.

10. The computer-implemented method of claim 5, further comprising:

determining the first location as a current location of a mobile device that executes the application and that is associated with a user account;

determining the second location as an item delivery location along a delivery route assigned to the user account; and causing the application to present the travel time in association with the current location of the mobile device and the item delivery location.

11. The computer-implemented method of claim 5, wherein the data indicating the geographic feature is determined based at least in part on one or more of: satellite imagery of an area containing the first location and the second location, aerial imagery of the area, or terrestrial imagery of the area.

12. The computer-implemented method of claim 5, wherein the distance range includes a shortest travel distance between ends of the travel segment and a longest travel distance between the end, wherein the longest travel distance being different than the shortest travel distance.

13. The computer-implemented method of claim 5, further comprising:

determining that no pedestrian network path data is available for another travel segment of the travel path; and representing the other travel segment as a shortest distance between a start point and an end point of the other travel segment, wherein the input is generated further based at least in part on the shortest distance.

14. One or more computer-readable storage media storing instructions that, upon execution on a system, cause the system to perform operations comprising:

receiving, based at least in part on a first application programing interface (API) call from a device executing an application, a request of the application for a travel time between a first location and a second location, the application presenting a user interface at the device, the first API call generated based at least in part on an interaction with the user interface;

determining a travel path between the first location and the second location, the travel path comprising a travel segment;

determining data indicating a geographic feature of the travel segment, the geographic feature including a distance range of a plurality of distances to travel the travel segment;

generating, based at least in part on the distance range, an input to an artificial intelligence model, the artificial intelligence model trained to predict travel times;

determining the travel time based at least in part on an output of the artificial intelligence model in response to the input, the output indicating the travel time; and sending, to the device, a response to the first API call, the response indicating a delivery route based at least in part on the travel time and causing the device to control an unmanned vehicle based at least in part on the delivery route.

15. The one or more computer-readable storage media of claim 14, storing further instructions that, upon execution on the system, cause the system to perform further operations comprising:

determining training data that comprises an actual travel time and an actual travel path associated with a previous travel between locations; and providing, during a training of the artificial intelligence model, the training data to the artificial intelligence model, wherein a loss function used in the training is based at least in part on the actual travel time and a predicted travel time corresponding to the actual travel path.

16. The one or more computer-readable storage media of claim 15, wherein determining the training data further comprises including, in the training data, one or more of: satellite imagery of an area containing the actual travel path, aerial imagery of the area, or terrestrial imagery of the area.

17. The one or more computer-readable storage media of claim 15, wherein determining the training data further comprises including, in the training data, one or more of: segment types associated with the actual travel path, environmental data associated with the actual travel path, user account data associated with the actual travel path, or item data associated with the actual travel path.

18. The one or more computer-readable storage media of claim 14, storing further instructions that, upon execution on the system, cause the system to perform further operations comprising:

causing the application to present the travel time in association with the travel path, wherein the travel path is determined based at least in part on a pedestrian network model.

19. The system of claim 1, wherein the one or more memory store further computer-readable instructions that, upon execution by the one or more processors, further configure the system to:

receive, based at least in part on a second API call from the device, a second request of the route planning application for an update to the first travel time;

receive, from a location sensor of the device, location data of the device;

generate based at least in part on the second request, the location data, and second haversine distance, a third input to the artificial intelligence model;

determine a second output of the artificial intelligence model based at least in part on the third input, the second output indicating an updated travel time; and send, to the device, a second response to the second API call, the second response indicating the updated travel time and causing the route planning application to present the updated travel time in real-time relative to the second request.

\* \* \* \* \*